(12) United States Patent
Elhamid et al.

(10) Patent No.: US 7,261,963 B2
(45) Date of Patent: Aug. 28, 2007

(54) CORROSION RESISTANT, ELECTRICALLY AND THERMALLY CONDUCTIVE COATING FOR MULTIPLE APPLICATIONS

(75) Inventors: Mahmoud H. Abd Elhamid, Grosse Pointe Woods, MI (US); Youssef Mikhail, Sterling Heights, MI (US); Richard H. Blunk, Warren, MI (US); Daniel J. Lisi, Eastpointe, MI (US)

(73) Assignee: General Motors Corporation, Detroit, MI (US)

( * ) Notice: Subject to any disclaimer, the term of this patent is extended or adjusted under 35 U.S.C. 154(b) by 498 days.

(21) Appl. No.: 10/292,407

(22) Filed: Nov. 12, 2002

(65) Prior Publication Data

US 2004/0091768 A1    May 13, 2004

(51) Int. Cl.
*H01M 2/00* (2006.01)
*H01M 2/02* (2006.01)
*H01M 2/14* (2006.01)

(52) U.S. Cl. .............................. 429/34; 429/38; 429/39
(58) Field of Classification Search ...................... None
See application file for complete search history.

(56) References Cited

U.S. PATENT DOCUMENTS

| | | | |
|---|---|---|---|
| 4,547,311 A | 10/1985 | Sako et al. | |
| 4,810,600 A | 3/1989 | Periard et al. | |
| 5,798,188 A * | 8/1998 | Mukohyama et al. | 429/34 |
| 6,248,456 B1 | 6/2001 | Yamane et al. | |
| 6,291,094 B1 * | 9/2001 | Yoshimura et al. | 429/34 |
| 6,322,919 B1 | 11/2001 | Yang et al. | |
| 6,372,376 B1 * | 4/2002 | Fronk et al. | 429/41 |
| 6,607,857 B2 * | 8/2003 | Blunk et al. | 429/34 |

FOREIGN PATENT DOCUMENTS

EP          1045467 A1          10/2000

\* cited by examiner

*Primary Examiner*—Stephen Kalafut
*Assistant Examiner*—Julian Mercado
(74) *Attorney, Agent, or Firm*—Dinsmore & Shohl LLP

(57) ABSTRACT

Embodiments of an electrically conductive fluid distribution plate are provided, wherein the electrically conductive fluid distribution plate comprises a plate body defining a set of fluid flow channels configured to distribute flow of a fluid across at least one side of said plate, and a coating adhered to the plate in an area of the plate including the fluid flow channels defined by the plate body. The coating comprises expanded graphite comprising less than about 0.01% by weight of impurities. The coating also comprises less than about 10% by weight expanded graphite plus carbon black, and about 70% to about 95% by wt. binder, wherein the binder is comprised of a polymeric resin.

25 Claims, 7 Drawing Sheets

CORROSION RESISTANT, ELECTRICALLY AND THERMALLY CONDUCTIVE COATING FOR MULTIPLE APPLICATIONS

BACKGROUND OF THE INVENTION

The present invention relates generally to an electrically conductive coating, a method of making the coating and products therefrom.

SUMMARY OF THE INVENTION

A coating is provided that comprises graphite having a low bulk density. The coating may comprise graphite having a density of less than 1.6 gm/cm$^3$. The coating may comprise graphite of relatively high purity and substantially free of contaminates. The graphite used in the coating may be treated to produce expanded graphite. The treatment includes a chemical treatment that may be followed by a thermal treatment. The graphite in the coating, may contain less than 0.01 weight percent impurities. The coating may further comprise carbon black. In one embodiment, the carbon black contains less than 0.01 weight percent impurities.

In another embodiment, products are provided comprising a coating comprising expanded graphite and a substrate. The substrate may comprise at least one of a collection plate for a fuel cell, a battery terminal, an electrical connection terminal, electrostatic components, and applications requiring high corrosion resistance, and good thermal and electrical conductivity.

In one embodiment, an electrically conductive fluid distribution plate is provided comprising a plate body defining a set of fluid flow channels configured to distribute flow of a fluid across at least one side of the plate and a coating adhered to the plate. The coating comprises graphite, carbon black, and a binder. The coating comprises less than about 10% by weight, total carbon.

In still another embodiment, a coating is provided comprising graphite, carbon black, and a binder. The graphite, carbon black, and binder are provided in proportions such that the coating exhibits a total resistance, contact and bulk, less than 20 mohm cm$^2$ at compression pressure exceeding 200 psi.

In still yet another embodiment, a method of coating a fluid distribution plate is provided comprising mixing graphite and carbon black, milling the graphite and carbon black in a binder for a predetermined milling time sufficient to create a coating having a total resistance of about 20 mohm cm$^2$, spraying the coating on the plate to form a coated fluid distribution plate, and curing the coated fluid distribution plate.

The present invention will be more fully understood from the following description of preferred embodiments of the invention taken together with the accompanying drawings. It is noted that the scope of the claims is defined by the recitations therein and not by the specific discussion of features and advantages set forth in the present description.

BRIEF DESCRIPTION OF THE DRAWINGS

The following detailed description of the embodiments of the present invention can be best understood when read in conjunction with the following drawings, where like structure is indicated with like reference numerals and in which.

Figure 1:
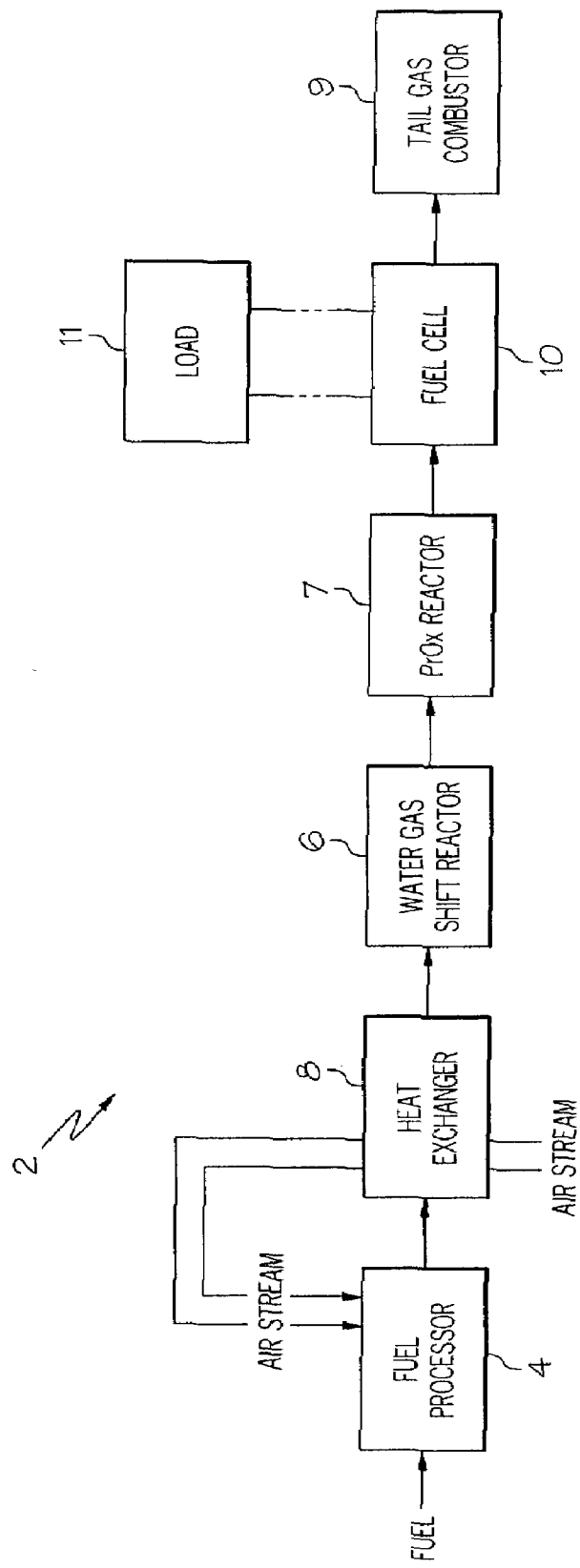
FIG. 1 is a schematic illustration of a fuel cell system.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE EMBODIMENTS OF THE INVENTION

A coating is provided that is corrosion resistant, electrically and thermally conductive. The coating may comprise graphite, carbon black, and a binder presented in amounts yielding a desired total carbon content of the coating. Suitable amounts are selected to yield desired plate properties. For example, the coating may comprise between about 5% by weight and about 70%, by weight, total carbon, and more specifically, about 10% by weight total carbon. The coating may comprise less than about 10% by weight total carbon.

The amount of total carbon in the coating is primarily a result of the respective amounts of graphite and carbon black in the coating. In one embodiment, the coating comprises graphite and carbon black at a ratio of about 2:1, by weight. Referring specifically to the amount of graphite in the coating, in one embodiment, the coating may comprise between about 3.3% by weight and about 50%, by weight graphite. Referring specifically to the amount of carbon black in the coating, the coating may comprise between about 1.7% by weight and about 20%, by weight, carbon black. Accordingly, various embodiments of the present invention contemplate graphite to carbon black ratios other than the above-noted 2:1 ratio. For example, by way of illustration and not limitation, the above noted weight % ranges support graphite to carbon black ratios from about 1:1 to about 4:1. In addition, to the differing amounts of graphite and carbon black, the coating may also include differing amounts of binder. The amount of binder may vary depending upon the amount of graphite and carbon black used in she coating. Generally, higher binder content is desired for enhanced adhesion, corrosion resistance, and application flow. In one embodiment, the coating comprises between about 95% by weight and about 0% by weight of binder, and more specifically about 90% by weight of the binder. In one embodiment, the amount of binder is between about 95% by weight and about 70% by weight of said polymeric resin.

Thus, a variety of different coating compositions are contemplated by the present invention. In one embodiment, the coating is in the form of a gel. Specifically, in one embodiment, the coating comprises about 6.7% by weight of expanded graphite, having a particle size from about 5 μm to about 90 μm, about 3.3% by weight of acetylene black, having a particle size of about 0.05 μm to about 0.2 μm, and about 90% by weight of polyamide imide binder.

Various types of graphite are suitable for use in the coating. The graphite may be selected from expanded graphite, graphite powder, graphite flakes. The graphite may be characterized by a particle size between about 5 μm and about 90 μm. The graphite may have a low density. The density is generally less than 1.6 gm/cm$^3$, and more specifically, less than about 0.3 gm/cm$^3$. The density may range between about 0.05 gm/cm$^3$ and about 0.2 gm/cm$^3$, and more specifically between about 0.1 gm/cm$^3$ to about 0.2 gm/cm$^3$.

The graphite may have a relatively high purity and being substantially free of contaminates. Thereby, producing a coating that generally contains less than 0.01% by weight of impurities, and more specifically less than 0.0001% by weight of impurities. In other embodiments of the present invention, the coating may having less than 0.005% by weight of impurities or less than 0.001% by weight of impurities.

In order to achieve the high purity and low density, the graphite in the coating may be chemically treated. The chemical treatment may be followed with a thermal treatment. The chemical treatment may occur using at least one of sulfuric acid, nitric acid, and mixtures thereof. The chemical treatment may also be performed with at least one of phosphorous, hydrogen peroxide, compounds of sulfur, sulfur trioxide and combinations thereof. The thermal treatment may expose the treated graphite to temperatures of about 2000° F. and above.

The chemical and thermal treatment occurs for a sufficient amount of time to expand the graphite to density and purity ranges explained above. When thermally treated, the chemicals used in the chemical treatment are bound between layer planes of the flake graphite. This causes the graphite to expand in the c-direction causing the flakes to form long worm-like tendrils, or expanded graphite. These tendrils or worms are very light and fluffy so that the graphite has a very low density. The chemical and thermal treatment may produce a highly pure graphite material, such as a graphite material having less than 0.5 weight percent impurities, particularly cations or cation producing materials such as metals. The worm like tendrils may also be compressed into the graphite sheet. By mechanically breaking the graphite, low density graphite particles can be produced. Some graphite particles can be less than 100 μm.

In addition, various types of carbon black are suitable for use in the coating. By way of illustration and not by limitation, the carbon black may be selected from acetylene black, Ketjen black™, Vulcan black™, Regal™, furnace black, black pearl™, and combinations thereof. Carbon black may be characterized by a particle size between about 0.05 and about 0.2 μm. The carbon black generally contains less than 0.01% by weight of impurities and more specifically less than 0.0001% by weight of impurities. In other embodiments of the present invention, the coating may having less than 0.005% by weight of impurities or less than 0.001% by weight of impurities.

The graphite having any of the above described features for use in a coating according to the present invention may be produced by any suitable method, a specific method is described below. In one embodiment a suitable graphite material may be used that is available from Sigri Great Lakes under the tradename Sigriflex. More specific embodiments and applications are described hereafter.

Many types of binders are suitable for use in the coating. In one embodiment, the binder comprises a polymeric resin. Suitable polymeric resins include polyamide imide, polyimide, poly vinyl ester and combinations thereof. Suitable vehicles for the binders include, but not limited to, propylene glycol methyl ether acetate, N-methyl-2-pryrrlidone, xylene and combinations thereof.

Furthermore, the coating may be manufactured such that it comprises less than 200 ppm of metal contaminants. In one embodiment, the coating exhibits a contact resistance between about 60 and about 5 mohm cm$^2$, at a contact pressure of between 25 and about 200 psi and, more specifically, the coating exhibits a contact resistance less than 10 mohm cm$^2$ at a compression pressures at and exceeding about 200 psi. A total resistance of less than about 20 mohm cm2 at compressions pressures exceeding about 200 psi is provided by the coating. Due to synergism between the expanded graphite and carbon black in the coating, the contact resistance remains low, less than 20 mohm cm$^2$, at low total carbon content. By "synergism" we mean that the combination of graphite and carbon black produce a lower contact resistance than when either the graphite or the carbon black are used alone at the same total carbon content.

The coating may be placed on a substrate to produce a wide variety of products. The substrate may comprise at least one of a collection plate for a fuel cell, a battery terminal, an electrical connection terminal, on a substrate as an electrostatic coating, and applications requiring high corrosion resistance, and good thermal and/or electrical conductivity.

Electrically conductive fluid distribution plates are used in fuel cells to conduct electrical current and distribute fluids within the fuel cell. For example, bi-polar electrically conductive fluid distribution plates are often utilized to provide cell interconnection when fuel cells are stacked together. Similarly, end plates reside at either end of the fuel cell or fuel cell stack to collect current, provide stability, and distribute fluids. One embodiment comprises an electrically conductive fluid distribution plate that has low contact resistance, high corrosion resistance and is economically efficient to produce.

Referring to FIG. 1, a fuel cell system 2 for automotive applications is shown. It is to be appreciated, however, that other fuel cell system applications, such as for example, in the area of residential systems, may benefit from the present invention. As illustrated, the fuel cell system 2 includes a fuel processor 4, a water-gas shift reactor 6, a preferential oxidation (PrOx) reactor 7, at least one heat exchanger 8, a tail gas combustor 9, and a fuel cell 10. An explanation of these components and the operation of the fuel cell system 2 follows. It is to be appreciated that while one particular fuel cell system design is described, the present invention may be applicable to any fuel cell system designs where fluid distribution plates have utility.

In the fuel processor 4 a hydrocarbon fuel, such as gasoline or methane, air and steam are mixed, heated, and sent into a primary reactor having a catalyst. The mixture is split into hydrogen, carbon monoxide, and other process gases, as the mixture flows over and reacts with the catalyst, forming a hydrogen-rich stream. Suitable catalyst materials include platinum group metals and base metals. This reaction occurs at temperatures in the range between about 700° C. and about 800° C.

The hydrogen-rich stream leaving the fuel processor 4 enters the water-gas shift reactor 6. Oxygen from water is used to convert carbon monoxide to carbon dioxide leaving additional hydrogen and increasing system efficiency. Operating temperatures of the shift reactor 6 range from about 250° C. to about 450° C. The hydrogen-rich stream leaving the shift reactor 6 then enters into the PrOx reactor 7, where the final cleanup of carbon monoxide takes place before the hydrogen-rich stream enters the fuel cell stack. Air is added to supply the oxygen needed to convert most of the remaining carbon monoxide to carbon dioxide, leaving additional hydrogen behind. Operating temperatures in the PrOx reactor 7 range from about 80° C. to about 200° C. Combined, the three reactors extract hydrogen from the fuel, and reduce or eliminate harmful emissions.

The three reactors are quickly heated to their operating temperatures before the fuel is introduced. The heat exchanger 8 is therefore used to regulate the various temperatures throughout the fuel cell system 2. Typically, the heat exchanger 8 preheats the steam and air streams before entering into the fuel processor 4. The waste heat from the hydrogen-rich stream exits the primary reactor of the fuel processor 4.

The hydrogen-rich stream then is supplied to the fuel cell 10, which may comprise a stack of fuel cells, and reacted with oxygen from a source, such as air, to produce electricity, which can be used to power a load 11. The small quantities of unused hydrogen that leave the fuel cell 10 are consumed in the tail gas combustor 9 which operates at a temperature between about to 300° C. to about 800° C.

Figure 2:
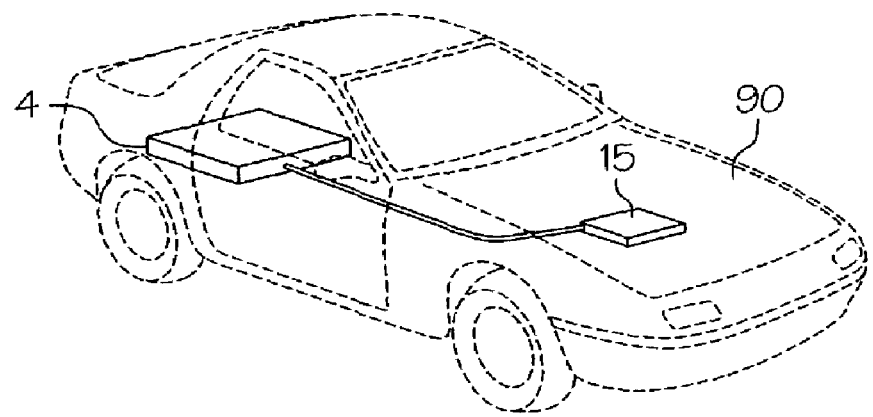
FIG. 2 is a schematic illustration of a vehicle including a fuel cell system.

Referring to FIG. 2, a vehicle is shown having a vehicle body 90, and a fuel cell system having a fuel cell processor 4 and a fuel cell stack 15. A discussion of the present invention as embodied in a fuel cell stack and a fuel cell, is provided hereafter in reference to FIGS. 3-9.

Figure 3:
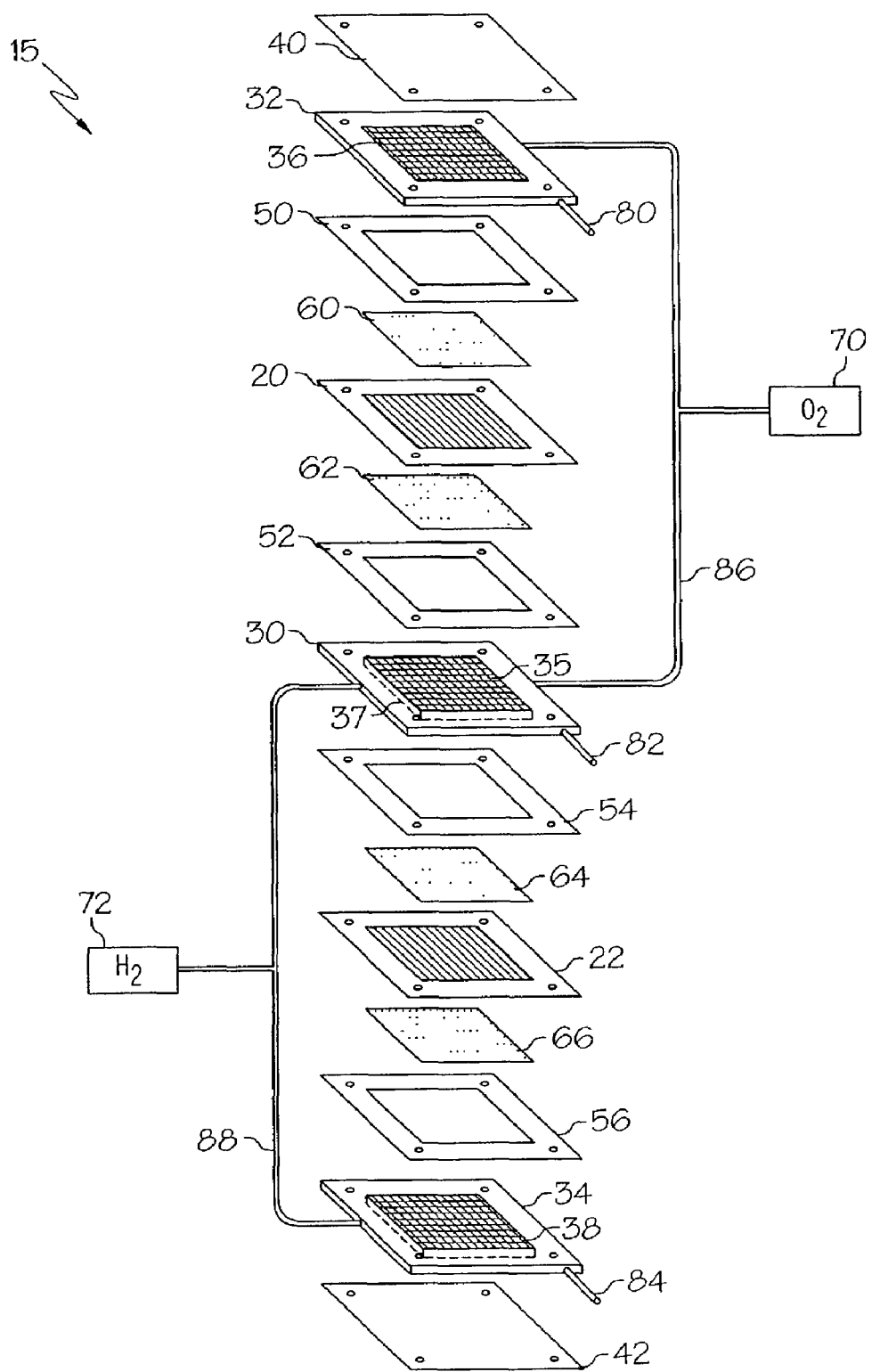
FIG. 3 is a schematic illustration of a fuel cell stack employing two fuel cells.

FIG. 3 depicts a two fuel cell, fuel cell stack 15 having a pair of membrane-electrode-assemblies (MEAs) 20 and 22 separated from each other by an electrically conductive fluid distribution plate 30. Plate 30 serves as a bi-polar plate having a plurality of fluid flow channels 35, 37 for distributing fuel and oxidant gases to the MEAs 20 and 22. By "fluid flow channel" we mean a path, region, area, or any domain on the plate that is used to transport fluid in, out, along, or through at least a portion of the plate. The MEAs 20 and 22, and plate 30, are stacked together between clamping plates 40 and 42, and electrically conductive fluid distribution plates 32 and 34. Plates 32 and 34 serve as end plates having only one side containing channels 36 and 38, respectively, for distributing fuel and oxidant gases to the MEAs 20 and 22, as opposed to both sides of the plate.

Nonconductive gaskets 50, 52, 54, and 56 provide seals and electrical insulation between the several components of the fuel cell stack. Gas permeable carbon/graphite diffusion papers 60, 62, 64, and 66 press up against the electrode faces of the MEAs 20 and 22. Plates 32 and 34 press up against the carbon/graphite papers 60 and 66 respectively, while the plate 30 presses up against the carbon/graphite paper 64 on the anode face of MEA 20, and against carbon/graphite paper 60 on the cathode face of MEA 22.

An oxidizing fluid, such as $O_2$, is supplied to the cathode side of the fuel cell stack from storage tank 70 via appropriate supply plumbing 86. While the oxidizing fluid is being supplied to the cathode side, a reducing fluid, such as $H_2$, is supplied to the anode side of the fuel cell from storage tank 72, via appropriate supply plumbing 88. The reducing fluid may be derived from a mixture of methane or gasoline, air, and water according to a reforming process in the presence of a catalyst. Exhaust plumbing (not shown) for both the $H_2$ and $O_2$/air sides of the MEAs will also be provided. Additional plumbing 80, 82, and 84 is provided for supplying liquid coolant to the plate 30 and plates 32 and 34. Appropriate plumbing for exhausting coolant from the plates 30, 32, and 34 is also provided, but not shown.

Figure 4:
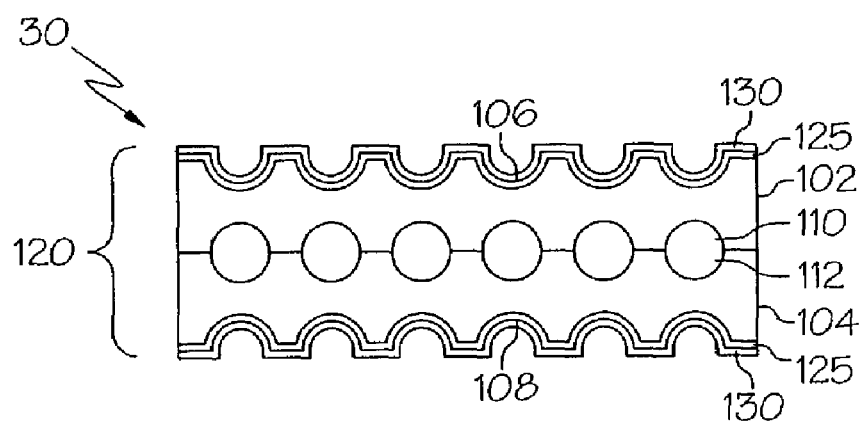
FIG. 4 is an illustration of an electrically conductive fluid distribution plate according to one embodiment of the present invention.

FIG. 4 illustrates an electrically conductive fluid distribution plate 30 comprising a first sheet of sheet 102 and a second sheet 104. First and second sheets 102, 104 comprise a plurality of fluid flow channels 106, 108 on their exterior sides through which the fuel cell's reactant gases flow typically in a tortuous path along one side of each plate. The interior sides of the first and second sheets 102, 104 may include a second plurality fluid flow channels 110, 112 through which coolant passes during the operation of the fuel cell. When the interior sides of first sheet 102 and second sheet 104 are placed together to form a plate body 120, the fluid flow channels connect and form a series of channels for coolant to pass through the plate 30.

The plate body 120 shown in FIG. 4 may be formed from a single sheet, or plate, rather than two separate sheets. When the plate body 120 is formed from a single plate, the channels may be formed on the exterior sides of the plate body 120 and through the middle of the plate body 120 such that the resulting plate body 120 is equivalent to the plate body 120 configured from two separate sheets 102, 104.

The plate body 120 may be formed from a metal, a metal alloy, or a composite material, and may be conductive, or may be a relatively weak electrically conductive or insulating material wherein the coating acts as a highly electrically conductive shell. In one embodiment, a passivating metal or a passivating alloy forms the plate body 120. By "passivating metal" or "passivating alloy" we mean a metal or an alloy that forms an inactive passivating layer as a result of reaction with ambient substances such as air or water. For example, the passivating layer 125 may be a metal oxide. Metal oxides typically act as barriers to further oxidation by requiring oxygen to diffuse through the layer to reach the metal or alloy surface. Thus, the passivating layer can protect the integrity of the metal or metal alloy.

Suitable metals, metal alloys, and composite materials should be characterized by sufficient durability and rigidity to function as a fluid distribution plate in a fuel cell. Additional design properties for consideration in selecting a material for the plate body include gas permeability, conductivity, density, thermal conductivity, corrosion resistance, pattern definition, thermal and pattern stability, machinability, cost and availability Available metals and alloys include titanium, stainless steel, nickel based alloys, and combinations thereof. Composite materials may comprise graphite, graphite foil, graphite powders in a polymer matrix, carbon fiber paper and polymer laminates, polymer plates with metal cores, conductively coated polymer plates, and combinations thereof.

First and second sheets 102, 104 are typically between about 0.002 to about 0.02 inches thick. The sheets 102, 104 may be formed by machining, molding, cutting, carving, stamping, photo etching such as through a photolithographic mask, or any other suitable design and manufacturing process. It is contemplated that the sheets 102, 104 may comprise a laminate structure including a flat sheet and an additional sheet including a series of exterior fluid flow channels. An interior metal spacer sheet (not shown) may be positioned between the first and second sheets 102, 104.

The coating for the electrically conductive fluid distribution plate can be prepared by milling the graphite and carbon black in a binder. The milling typically occurs for an amount of time between about 1 hours to about 20 hours, and more specifically for about two hours. The milling conditions, such as the amount of time the coating is milled, can vary depending upon the materials used in the coating and the desired properties of the coating.

The coating is then applied to the plate body. The coating may be applied by any suitable method such as laminating (such as by hot rolling), brushing, spraying, spreading (such as with a doctor blade), and screen printing. In one embodiment the coating is sprayed onto the plate body two coats of the coating are applied to the plate body to form a coated plate body. The coated plate body is then cured at a temperature between about 150° C. and about 300° C., and more specifically, at a temperature of about 260° C. The coated plate body is cured for about 10 minutes to about 30 minutes, and more specifically, for about 15 minutes.

An electrically conductive fluid distribution plate according to the various embodiments of the present invention has increased adhesion of the coating to the plate body and increased corrosion resistance due to the low amount of total carbon in the coating. Moreover, The electrically conductive fluid distribution plate permits the use of low compression pressures to increase fuel cell stack life.

The present invention will be further explained by way of examples. It is to be appreciated that the present invention is not limited by the examples.

EXAMPLE

A coating was prepared by milling expanded graphite, EG15 produced by SGL Polycarbon INC Valencia, Calif., having graphite particles 90% of which are less than 70 microns, together with acetylene black (AB), at a ratio of 2:1, in polyamide imide for two hours. The resulting coating comprises less than 10% by weight, total carbon. Two coats of the coating were applied to three different substrates by spraying. The first substrate was a graphite plate (Poco graphite. Inc.) upon which two coats of the coating were applied to the plate. No surface preparation was performed on the plate. The second substrate was a cathodically cleaned 316Lss stainless steel plate upon which two coats of the coating were applied. The third substrate was a titanium plate that was scotch brite polished. Two coats of the coating were applied to the titanium plate. The three coated substrates were cured at 260° C. for 15 minutes.

Figure 5:
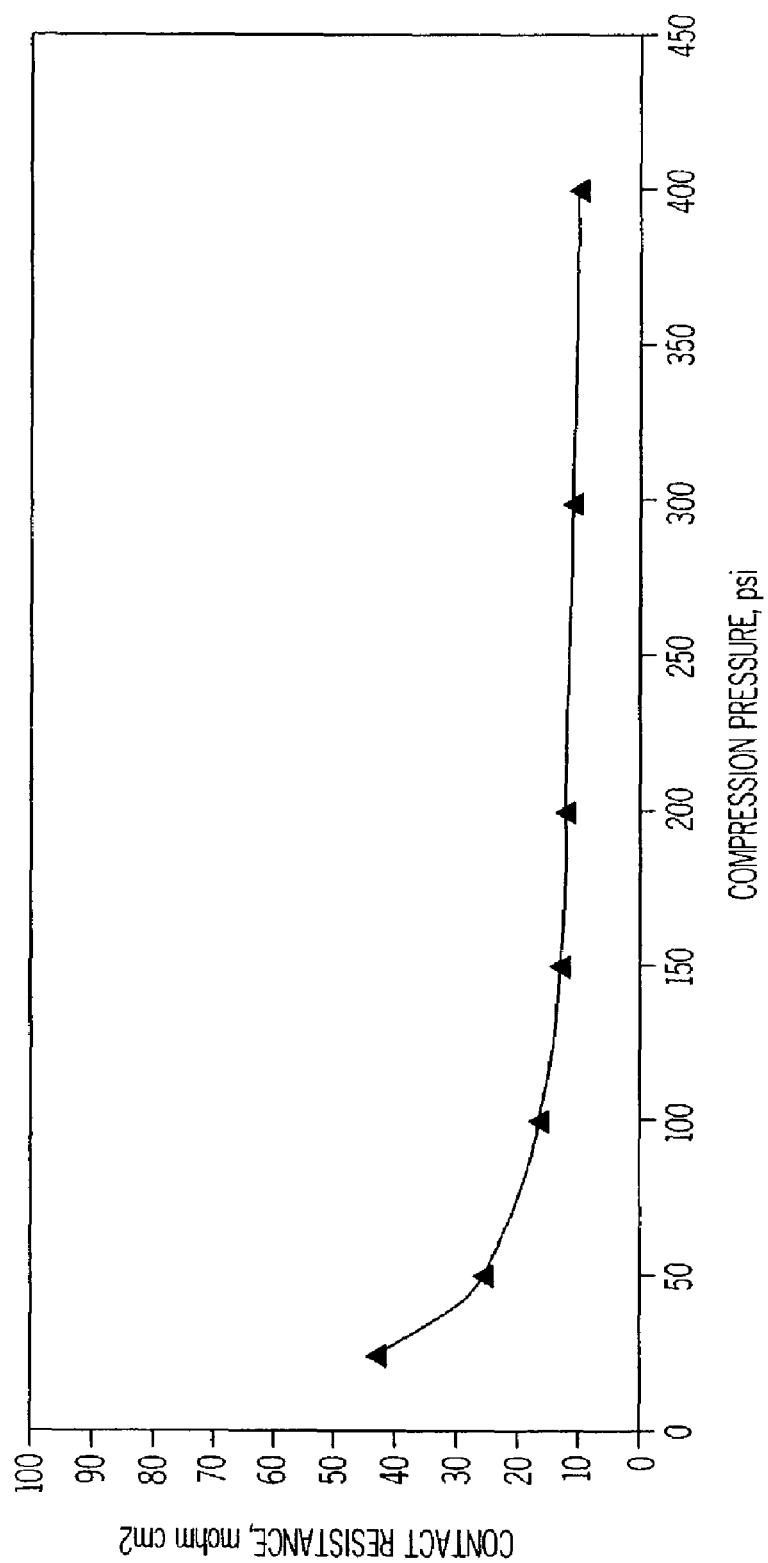
FIGS. 5-7 are graphs showing the total resistance of coated substrates including substrates coated according to the present invention.
Figure 6:
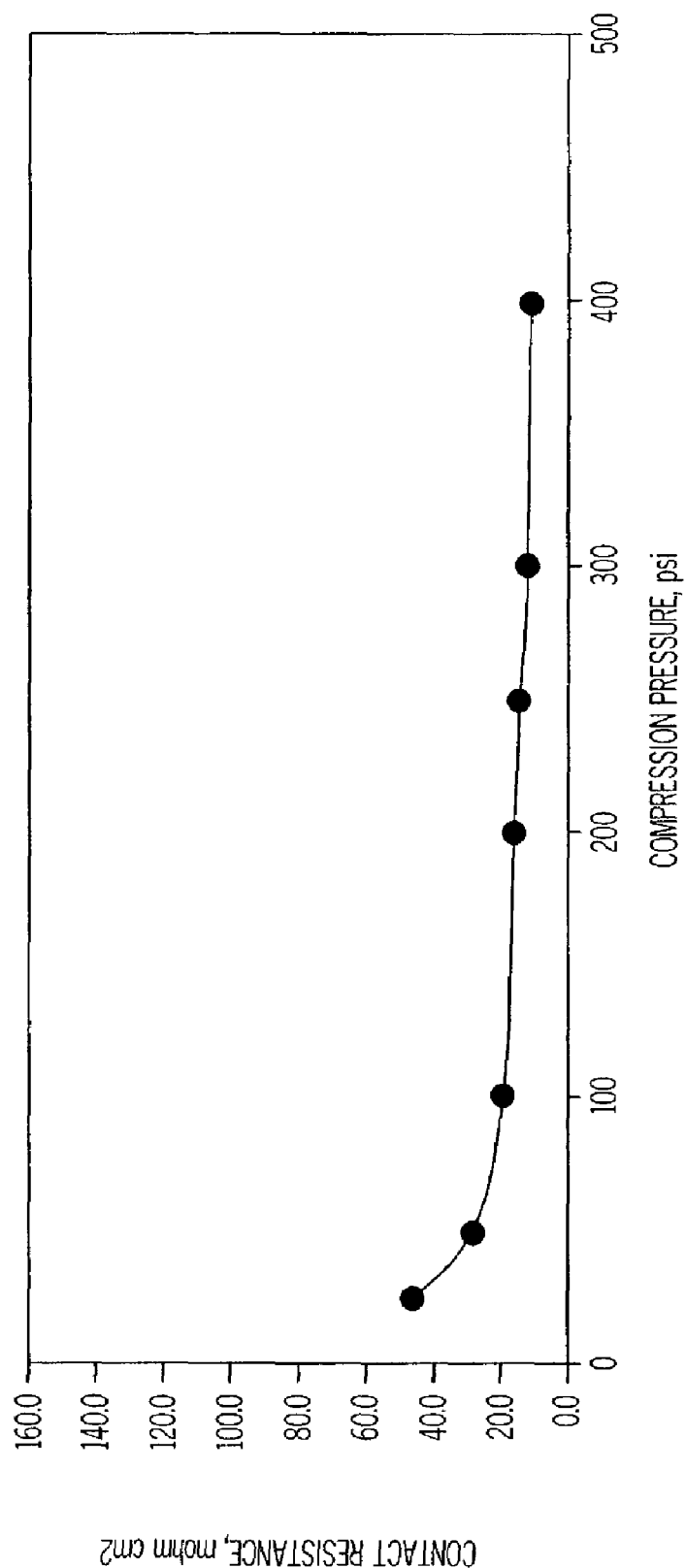
Figure 7:
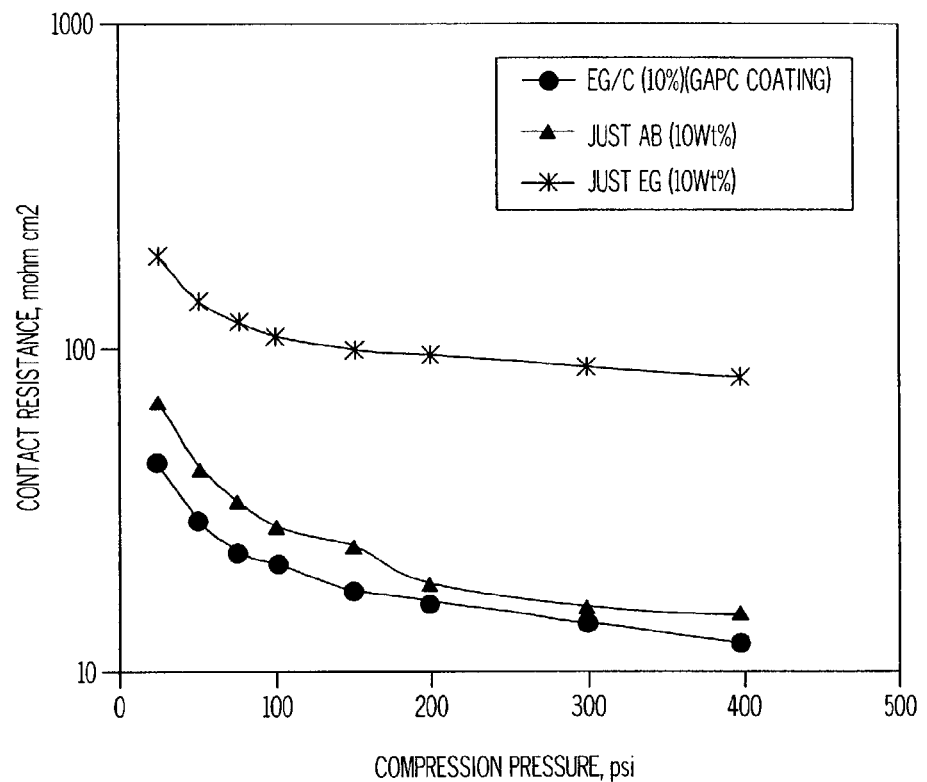

FIGS. 5-7 are graphs showing the contact resistance of the coated substrates. The graphs exhibit the contact resistance on the y-axis and the compression pressure used in the fabrication on the x-axis. FIG. 5 shows that the coated graphite substrate exhibits a contact resistance that is less than 20 mohm cm$^2$ at compression pressures less than 200 psi and was similar to the value obtained on uncoated graphite. FIG. 6 shows that the coated cathodically cleaned 316Lss stainless steel exhibits a contact resistance of about 20 mohm cm$^2$ at a compression pressure $\geq$200 psi. FIG. 7 shows the contact resistance of the coated titanium substrate. The graph shows the coated titanium substrate has a contact resistance less than 20 mohm cm$^2$ at compression pressures of 200 psi and higher. The unit mohm cm$^2$ includes the contact resistance between diffusion paper, the coating surface, the bulk resistance of the coating, and the contact resistance between the coating and the substrate.

FIG. 7 also shows the synergistic characteristic of the graphite and carbon black combination by comparing the stainless steel substrate coated with the coating having an expanded graphite (EG15) and a carbon black (AB) with a stainless steel substrate that were coated with only EG15 or only AB. As can be seen in FIG. 7, the substrate having the coating that includes the combination of the EG15 and AB with 10% by weight total carbon exhibited a lower contact resistance than the substrate coated with only EG15 and the substrate coated with only AB and at 10% wt total carbon content.

Figure 8:
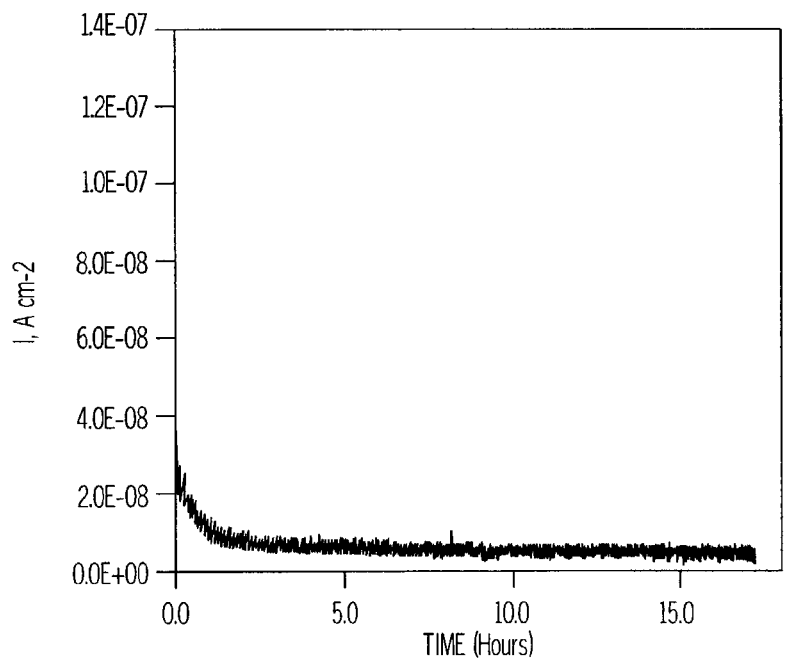
FIG. 8 is a graph showing the potentiostatic current transient of a coated substrate according to the present invention.

FIG. 8 shows the potentiostatic current transient that was obtained from the coated cathodically cleaned 316L stainless steel substrate. In order to obtain the potentiostatic current transient, the coated substrate was placed under simulated fuel cell cathode conditions. Specifically, the coated substrate was placed in an aerated solution having a pH of 3 at 80° C. at +0.6 V (Ag/AgCl). The graph exhibits the amount of time on the x-axis and the current transient on the y-axis. The graph shows a negligible corrosion current suggesting that the coating is electrochemically stable in a fuel cell environment. Adhesion testing on the coated sample after the corrosion experiment showed excellent adhesion of the coating to the substrate. In addition, the contact resistance did not change on the coated sample before and after the corrosion and the adhesion tests. This test only takes into account the contact resistance of one side of the plate.

Figure 9:
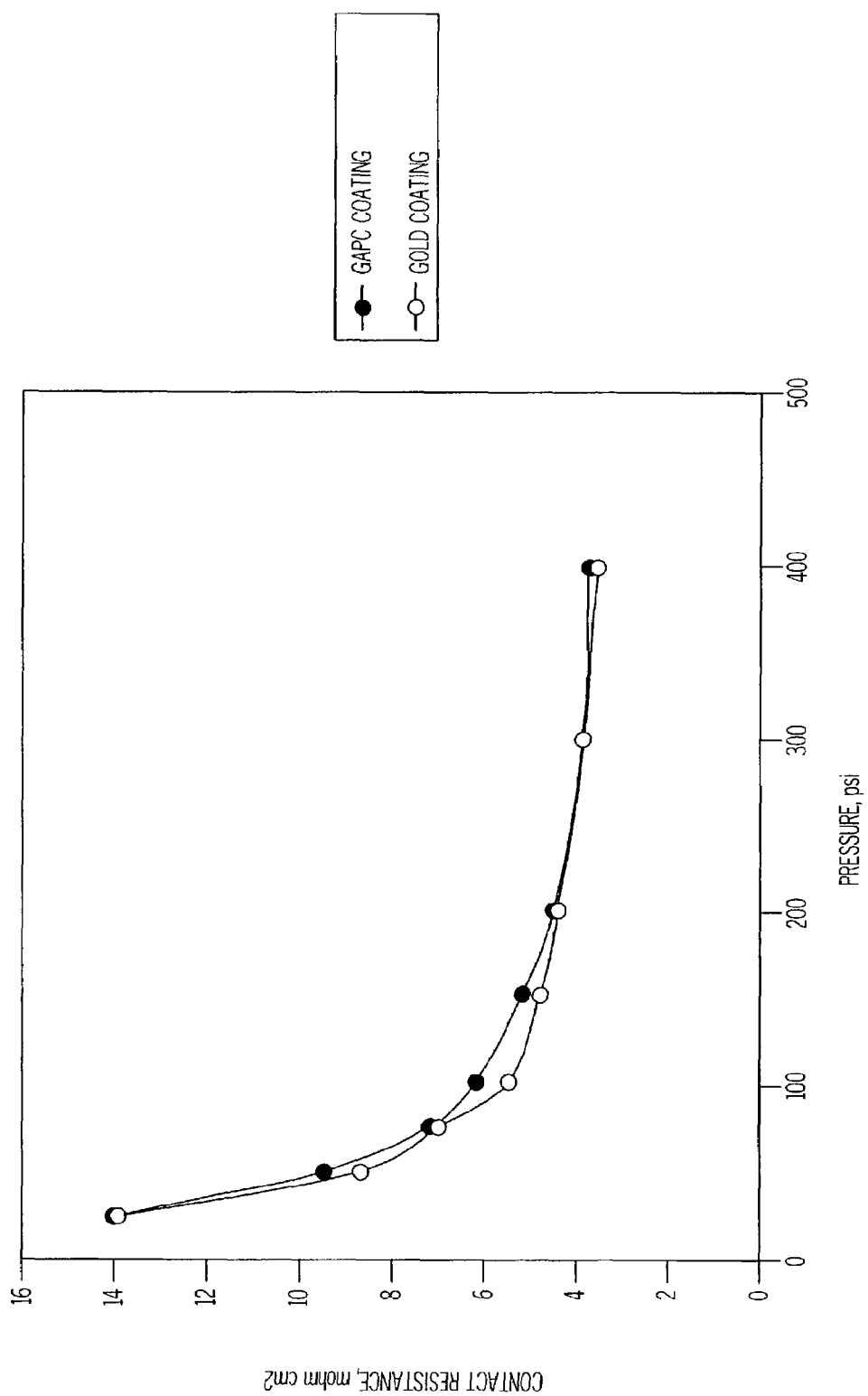
FIG. 9 illustrates a comparison of a coated substrate according to the present invention as compared to a substrate coated with gold.

FIG. 9 illustrates a comparison of a coated substrate according to one embodiment of the present invention as compared to a substrate coated with gold. The gold was deposited onto a clean stainless steel substrate using physical vapor deposition (PVD) at a temperature exceeding 30-40° C. As the graph shows, the contact resistance of the coated substrate is identical to the contact resistance of gold through the compression pressure range (25-400 psi) tested.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

We claim:

1. An electrically conductive fluid distribution plate comprising:
   a plate body defining a set of fluid flow channels configured to distribute flow of a fluid across at least one side of said plate; and
   a coating adhered to said plate in an area of said plate including said fluid flow channels defined by said plate body, wherein said coating comprises
      expanded graphite comprising less than about 0.01% by weight of impurities,
      carbon black, and
      a binder,
         wherein said coating comprises less than about 10% by weight said expanded graphite plus carbon black, and about 70% to about 95% by wt. binder, the binder being comprised of polymeric resin.

2. A plate as claimed in claim 1, wherein said plate further comprises a set of fluid flow channels configured to distribute flow of a fluid across first and second sides of said plate.

3. A plate as claimed in claim 1, wherein said plate body further comprises a first sheet and a second sheet.

4. A plate as claimed in claim 3, wherein said first sheet is between about 0.002 inches to about 0.02 inches thick.

5. A plate as claimed in claim 3, wherein said second sheet is between about 0.002 inches to about 0.02 inches thick.

6. A plate as claimed in claim 1, wherein said plate further comprises a set of fluid flow channels configured to distribute a flow of fluid through said plate body intermediate first and second sides of said plate body.

7. A plate as claimed in claim 1, wherein said plate is formed from a material comprising a passivating metal or passivating alloy.

8. A plate as claimed in claim 7, wherein said passivating metal or alloy comprises at least one of titanium, stainless steel, nickel based alloys, and combinations thereof.

9. A plate as claimed in claim 7, wherein said plate body further comprises a passivating layer on the surface of said passivating metal or passivating alloy.

10. A plate as claimed in claim 1, wherein said plate is formed from a material selected from the group consisting of a metal, an alloy, and a composite material.

11. A plate as claimed in claim 10, wherein said metal and said alloy comprise titanium, stainless steel, nickel based alloys, and combinations thereof.

12. A plate as claimed in claim 10, wherein said composite material comprises graphite filled polymer.

13. A plate as claimed in claim 1, wherein said coating comprises between about 3.3% by weight and about 10% by weight of said expanded graphite.

14. A plate as claimed in claim 1, wherein said expanded graphite comprises at least one of expanded graphite, graphite powder, graphite flake, and combinations thereof.

15. A plate as claimed in claim 1, wherein said expanded graphite is characterized by a particle size between about 5 μm and about 90 μm.

16. A plate as claimed in claim 1, wherein said coating comprises between about 1.7% by weight and about 10% by weight of said carbon black.

17. A plate as claimed in claim 1, wherein said carbon black consist essentially of a particle size between about 0.05 μm and about 0.2 μm.

18. A plate as claimed in claim 1, wherein said coating comprises said expanded graphite and said carbon black at a ratio of about 2:1 by weight.

19. A plate as claimed in claim 1, wherein said polymeric resin comprises at least one of polyamide imide, polyimide, poly vinyl ester, and combinations thereof.

20. A plate as claimed in claim 1, wherein said coating comprises less than 2000 ppm of metal contaminants.

21. A plate as claimed in claim 1, wherein said coating exhibits a contact resistance less than about 20 mohm cm$^2$ at 200 psi.

22. A plate as claimed in claim 1, wherein said coating exhibits a contact resistance that does not change significantly under simulated fuel cell conditions.

23. A plate as claimed in claim 1, wherein said coating exhibits a contact resistance that is substantially the same as the contact resistance of gold.

24. An electrically conductive fluid distribution plate as claimed in claim 1 wherein said coating comprises about 90% by wt. of binder.

25. An electrically conductive fluid distribution plate comprising:
a plate body defining a set of fluid flow channels configured to distribute flow of a fluid across at least one side of said plate; and
a coating adhered to said plate in an area of said plate including said fluid flow channels defined by said plate body, wherein said coating comprises
about 6.7% of expanded graphite, having a particle size of <90 μm and less than about 0.01% by weight of impurities,
about 3.3% of acetylene black, having a particle size of <0.2 μm, and
about 90% of polyamide imide,
wherein said expanded graphite plus carbon black exhibits a contact resistance less than 20 mohm cm$^2$ at a compression pressure of about 200 psi and greater.

* * * * *